(12) United States Patent
Yang et al.

(10) Patent No.: US 6,572,995 B2
(45) Date of Patent: Jun. 3, 2003

(54) FLUID FLOW CONTROL FOR COOL, EFFICIENT FUEL CELL OPERATION

(75) Inventors: Deliang Yang, Vernon, CT (US); Constance J. King, Brooklyn, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 16 days.

(21) Appl. No.: 09/948,353

(22) Filed: Sep. 7, 2001

(65) Prior Publication Data

US 2003/0049506 A1 Mar. 13, 2003

(51) Int. Cl.⁷ .................................................. H01M 8/04
(52) U.S. Cl. ............................... 429/26; 429/32; 429/34
(58) Field of Search ............................. 429/26, 34, 32

(56) References Cited

U.S. PATENT DOCUMENTS 3,994,748 A 11/1976 Kunz et al.
5,547,776 A * 8/1996 Fletcher et al. ........... 429/26 X
5,879,826 A 3/1999 Lehman et al.
6,322,915 B1 * 11/2001 Collins et al. ............. 429/34 X

* cited by examiner

Primary Examiner—John S. Maples
(74) Attorney, Agent, or Firm—M. P. Williams

(57) ABSTRACT

A fuel cell stack (7) has a two-pass fuel flow field (11, 14) extending from a fuel inlet (8) around a fuel turnaround manifold (12) to a fuel outlet (15). The stack has two air flow fields (37, 40) extending from an air inlet (32) through an air turnaround manifold (38) to an air outlet (41), the air outlet (41) being adjacent to the fuel outlet (15). The stack includes a coolant flow field (23, 25, 27) which extends from a coolant inlet (21) to a coolant outlet (28), the coolant inlet being adjacent to both the fuel outlet and the air outlet. The fluid flow configuration provides lower temperature, a more even temperature profile, a higher coolant exit temperature, and permits operation with higher air utilization and lower coolant flow.

6 Claims, 4 Drawing Sheets

FLUID FLOW CONTROL FOR COOL, EFFICIENT FUEL CELL OPERATION

TECHNICAL FIELD

This invention relates to fuel cells, such as proton exchange membrane (PEM) fuel cells, in which the fuel reactant gas outlet and the oxidant reactant gas outlet are both adjacent to the coolant inlet thereby providing a more uniform temperature profile across each cell of the fuel cell stack, a lower maximum temperature in each cell of the fuel cell stack, a higher coolant exit temperature, higher water recovery, and further permitting operation with higher air utilization and lower coolant flow.

BACKGROUND ART

It is known that, in PEM fuel cells, the membrane must be wet in order to maintain high process efficiency and to avoid membrane degradation which will result in reactant gas crossover. Each proton formed at the anode will drag molecules of water with it as it passes through the membrane to the cathode side, thereby creating a water-pumping effect commonly known as proton drag. The water thus has to be replenished at the anode side of the membrane, continuously, for efficient operation. On the cathode side, water is produced as a byproduct of the process; this is commonly referred to as product water. The proton drag water and product water have to be removed from the cathode in order to prevent the water from blocking the passage of oxidant reactant gas to the cathode catalyst.

It is also known that the useful life of PEM fuel cell membranes is inversely related to their temperature. One of the byproducts of the process is internally generated heat; if hot spots are present in any cells, the membrane deteriorates at such spots and efficiency and life of the fuel cell stack goes down commensurately. Thus, the internally generated heat must be removed throughout each cell of the fuel cell stack in a manner that limits the temperature of hot spots.

In a typical PEM fuel cell stack, the oxidant reactant gas is air, which is provided in excess of the amount necessary to assure adequate oxygen throughout each cell of the fuel cell stack. Because of variations in the cross sectional area of the air flow field channels in each stack, sufficient air has to be provided to satisfy the needs of the cell with the smallest flow field cross sectional area. Higher air utilizations allow use of air pumps which require less electric power to operate, thereby increasing the overall efficiency of the fuel cell stack. However, extremely high overall air utilization results in loss of efficiency in random areas of the fuel cell stack. Thus, a balance must be struck; typical air utilizations may be on the order of 60% (supplying about 1.7 times more air than is necessary for the required oxygen). The unused air carries with it water vapor which is supplied by the proton drag water and product water at the cathode. If the amount of water removed as vapor or liquid in the air or fuel exhausts is too great, then additional water must be supplied in order to ensure that the membrane remains wet, particularly at the anode side.

Water management in a PEM fuel cell must accommodate the foregoing considerations. A desired relationship is to condense sufficient moisture out of the exiting air and fuel streams so that the amount of moisture which is expelled from the fuel cell stack balances the product water. To achieve this, a recent innovation disclosed in U.S. patent application Ser. No. 09/267,416 filed Mar. 12, 1999, now abandoned provides for the coolant inlet to be adjacent to the air outlet so that there is a minimum temperature differential between the exiting air and the entering coolant, thereby achieving substantial condensation of water within the fuel cell stack.

DISCLOSURE OF INVENTION

Objects of the invention, in a PEM fuel cell, include: assuring maximum recovery of product water within the fuel cell stack; achieving high performance with increased air utilization; reducing the maximum temperature in each cell of the stack; providing a more uniform temperature profile across each cell of the stack; achieving a higher coolant exit temperature in order to enhance waste heat rejection while having an adequately low coolant inlet temperature to promote condensation in the exiting oxidant reactant gas flow as well as the exiting fuel reactant gas flow; and reducing the flow of coolant in each cell.

According to the present invention, the pattern of fluid flow fields within each cell of a fuel cell stack are arranged so that the oxidant reactant gas outlet and the fuel reactant gas outlet are both adjacent to the coolant inlet, with the coolant exiting each fuel cell adjacent an edge thereof which is opposite to an edge adjacent to the coolant inlet of each fuel cell, and the fuel reactant gas inlet is displaced from the oxidant reactant gas inlet. In one embodiment, the reactant gas flow channels are "two-pass", flowing from an inlet manifold through half of each cell to a turnaround manifold, within which the gas is redistributed before flowing through the other half of each cell of the stack to an exit manifold. In that embodiment, the fuel reactant gas flow channels are orthogonal to the oxidant reactant gas flow channels, and the exit of the fuel reactant gas is adjacent to the exit of the oxidant reactant gas. Further in that embodiment, the coolant flows into each cell at a point adjacent to the reactant gas outlets, and then flows through flow channels which have three legs and two turns each, to exit each fuel cell at a point diametrically opposite to the coolant inlet.

This invention is predicated in part on the recognition that when fuel reactant flow fields are not dead ended, significant water can be carried out of the fuel cell in the fuel reactant gas exhaust, and is predicated in part on the concept that a balance maintained between rich and partially depleted oxidant reactant gas, partially depleted and rich fuel reactant gas, and coolant temperature will significantly reduce the highest temperature in each fuel cell and commensurately provide a more even temperature profile across each fuel cell.

The invention has been shown to reduce the maximum temperature of a fuel cell stack by over 15° F. (about 18° C.), while at the same time reducing the coolant flow by about half and increasing the overall oxidant utilization to near 80%. The invention reduces parasitic power loss by allowing smaller pumps for the oxidant reactant gas and for the coolant. The invention causes substantially the warmest part of the fuel cell to be near the coolant exit, which aids in waste heat rejection by permitting significant reduction in the size of an external heat rejection heat exchanger (such as the conventional radiator of an electric vehicle powered by a fuel cell). The condensation of moisture in the exiting fuel also heats the incoming coolant, raising the temperature of the fuel cell stack in that area somewhat, in turn raising the temperature, and thus the vapor pressure, of the incoming air in an adjacent area of the stack, thereby improving humidification of the incoming air.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
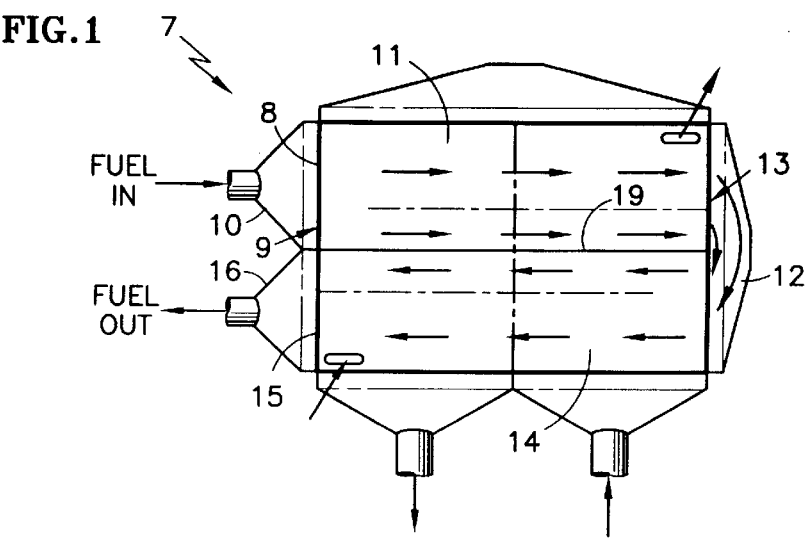
FIGS. 1–3 are schematic illustrations of fuel reactant gas flow, coolant flow and oxidant reactant gas flow, respectively, in a fuel cell practicing the present invention.
Figure 2:
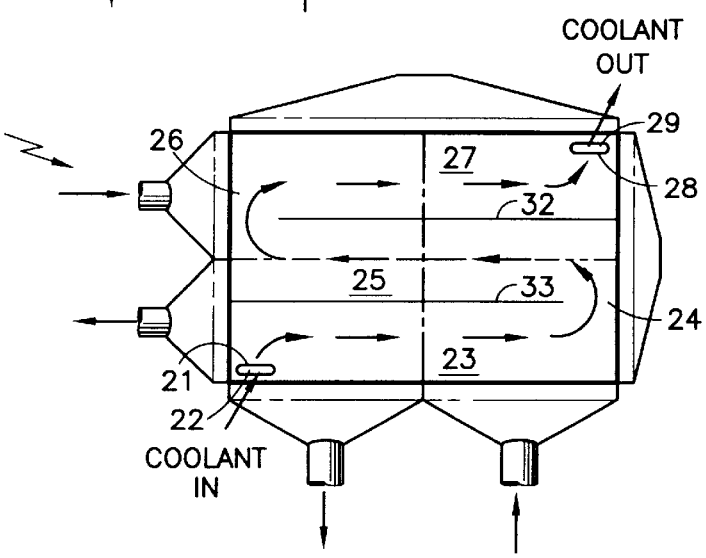
Figure 3:
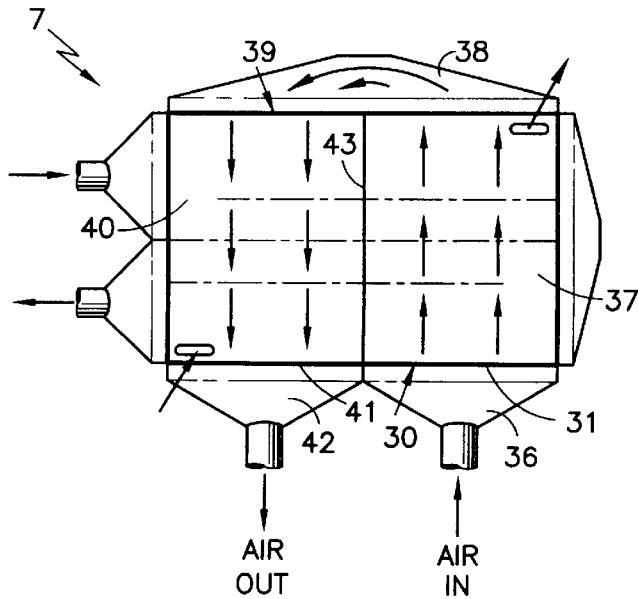

Referring to FIGS. 1–3, each fuel cell of a fuel cell stack 9 includes a fuel inlet 8 at a first end edge 9 of the fuel cell, fed by a fuel inlet manifold 10, a first-pass fuel flow field 11, a fuel turnaround manifold 12 at a second end edge 13, a second-pass fuel flow field 14, and a fuel outlet 15 at the first end edge 9, which feeds a fuel outlet manifold 16. The delineation between first pass 11 and second pass 14 flow fields is illustrated by a line 19 which is shown solid in FIG. 1 and as a double dot dash line in FIGS. 2 and 3. Each fuel cell of the fuel cell stack 9 also includes a coolant inlet 21 fed by an internal coolant inlet manifold 22, a first straight flow field portion 23, a first turnaround flow field portion 24, a second straight flow field portion 25, a second turnaround flow field portion 26, a third straight flow field portion 27, and a coolant outlet 28 which feeds into an internal coolant outlet manifold 29. The demarcation between the direction of coolant flow is shown in FIG. 2 by the solid lines 32, 33 and in FIGS. 1 and 3 with dot dash lines. Although the fuel cell 9 is shown as containing internal coolant manifolds 21, 29, other coolant manifold configurations, such as external coolant manifolds, may be used. In this embodiment, it is assumed that the oxidant reactant gas is air; however, the invention may be practiced using oxidant gases with oxygen concentrations greater or lower than air. In FIG. 3, the air flow field has an inlet 32 at a first side edge 33, fed by an air inlet manifold 36, a first flow field 37, a turnaround manifold 38 at a second side edge 39, a second flow field 40, and air outlet 41 at the first side edge 33, which feeds into an air outlet manifold 42. The demarcation between air flow direction in FIG. 3 is represented by a solid line 43 which is a dot dash line in FIGS. 1 and 2.

In the embodiment of FIGS. 1–3, both the fuel outlet 15 and the air outlet 41 are adjacent to the coolant inlet 21 which provides for a maximal amount of condensation of water vapor contained both within the air and the fuel streams. Furthermore, the coolant outlet 28 is essentially midway in both the flow of fuel along the fuel flow field 12 and the flow of air along the air flow field 37. This arrangement allows the coolant to exit the cell at close to the maximum cell temperature, and at the same time, the cell performance is not lowered by this high temperature due to the relatively high reactant partial pressures of the relatively fresh supply of reactants at this location. Reactant partial pressures are reduced near the flow field exits; however, the cell performance is retained due to the reduced water vapor pressure as a result of lower temperature near the exits.

Figure 4:
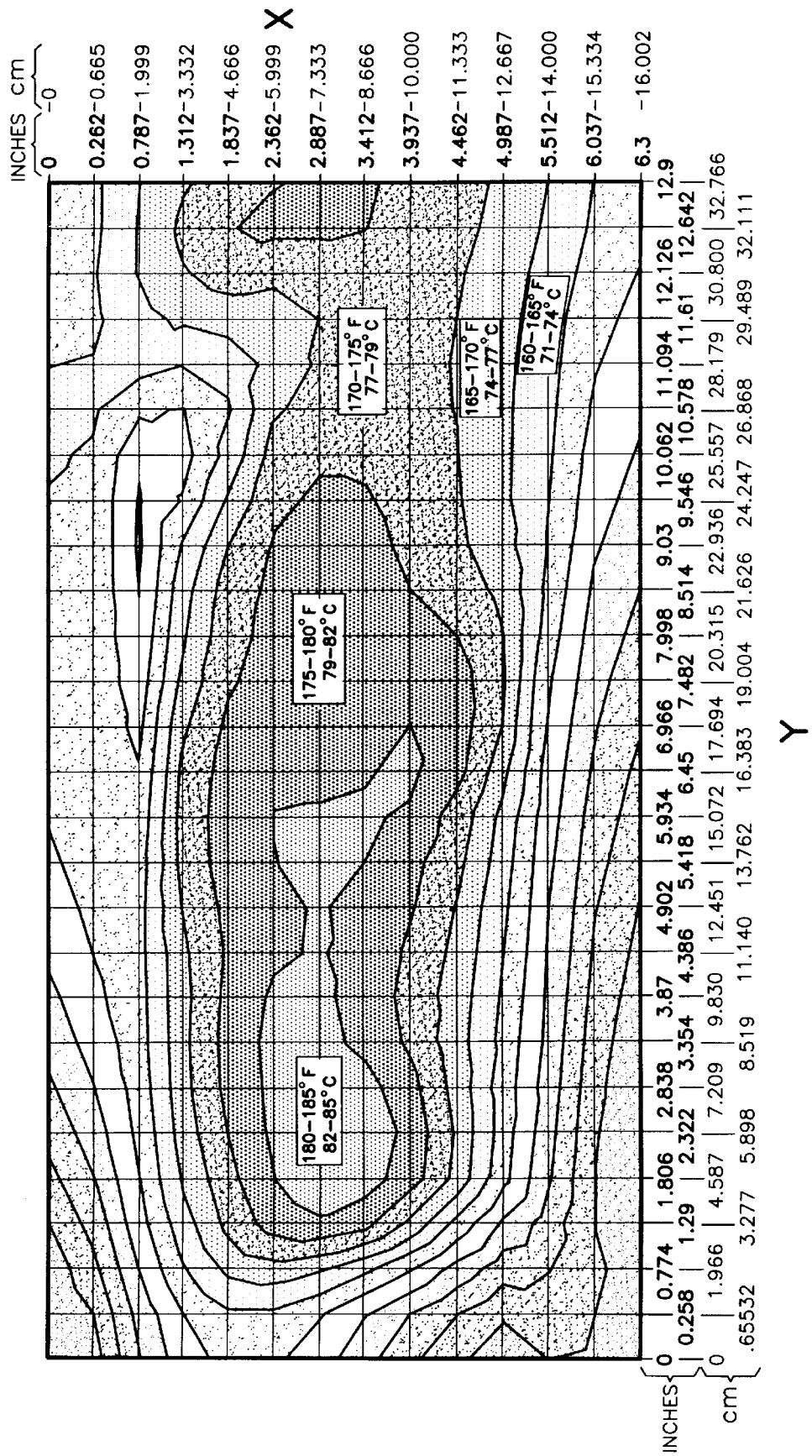
FIG. 4 is a plot of temperature distribution of a fuel cell stack not employing the invention.
Figure 5:
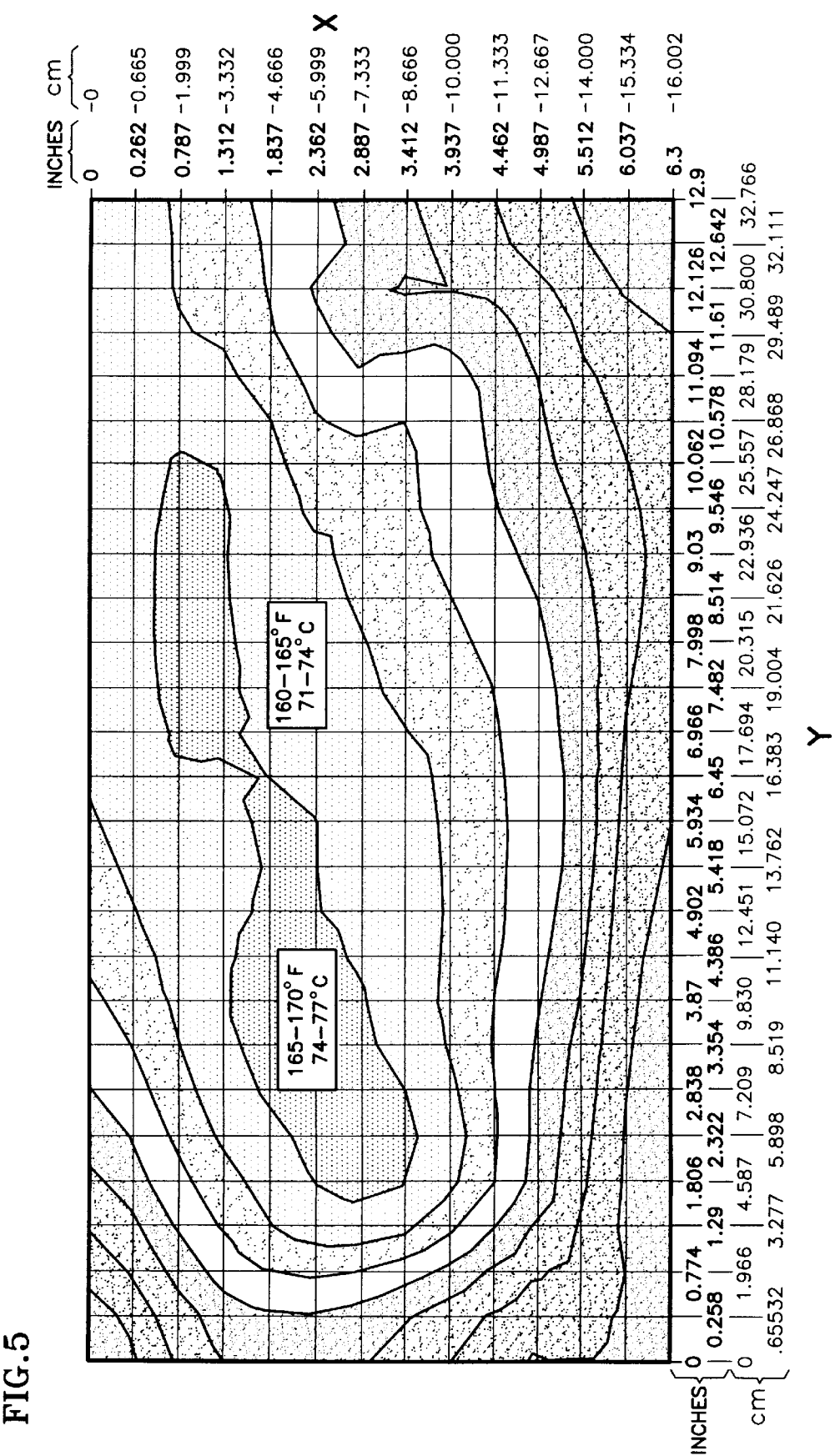
FIG. 5 is a plot of temperature distribution of a fuel cell stack employing the present invention.

In FIGS. 4 and 5, temperature profiles for similar fuel cells are illustrated: in FIG. 4, the fuel cell does not have the configuration of the invention, while in FIG. 5, the fuel cell has the configuration of the present invention. The temperatures shown in FIGS. 4 and 5 are air temperatures; but it is known that the air temperature will differ from the coolant temperature in a PEM fuel cell by only 2° F.–3° F. Both fuel cells are the same size, with the active area of each cell being about 12.9 inches by 6.3 inches. Each cell was operated with 80% fuel reactant gas utilization and 60% air utilization. Both fuel cells were cooled with 20 pounds per hour of water coolant per cell, the coolant entering at 135° F. The fuel cell in FIG. 4 was operated at 600 amps per square foot while the fuel cell illustrated in FIG. 5 and incorporating the present invention was operated at a higher current density of 700 amps per square foot. The degrees illustrated in FIGS. 4 and 5 are degrees Fahrenheit. In each figure, some of the ranges are marked; the successive ranges each have boundaries which are 5° F. cooler than the boundaries of the previous range. The coolest range in both FIGS. 4 and 5, in the upper and lower left, is a range of 130° F.–135° F. It is clear that the highest temperature in the fuel cell employing the invention (FIG. 5) is 15° cooler than that not employing the invention, and that the highest two ranges are moved upwardly and to the right in FIG. 5 compared with FIG. 4, thus causing the second warmest range to be adjacent to the coolant outlet 28 (FIG. 2). By causing the coolant exit temperature to be very close to the maximum temperature in the cell, the ability to extract the heat from the coolant with a smaller heat exchanger (radiator) is enhanced. Since both the fuel outlet 15 (FIG. 1) and the air outlet 40 (FIG. 3) are at the coolest part of each fuel cell (the lower left), significant condensation of water vapor contained in both the air and the fuel will take place, thereby ensuring adequate water recovery so that the fuel cell stack will remain in water balance, internally. Although it is not fully understood, it is believed that having the air inlet 35 and the fuel inlet 10 as far from each other as possible is one of the reasons that the improved temperature profile of FIG. 5 is obtained. In order to avoid the hot spot illustrated in FIG. 4, a fuel cell stack not employing the present invention would typically require 45 pounds of coolant per hour per fuel cell in order to reduce the hot spot temperature by 10 or 15 degrees. With the present invention, 20 pounds per hour per fuel cell is adequate as illustrated in FIG. 5.

Figure 6:
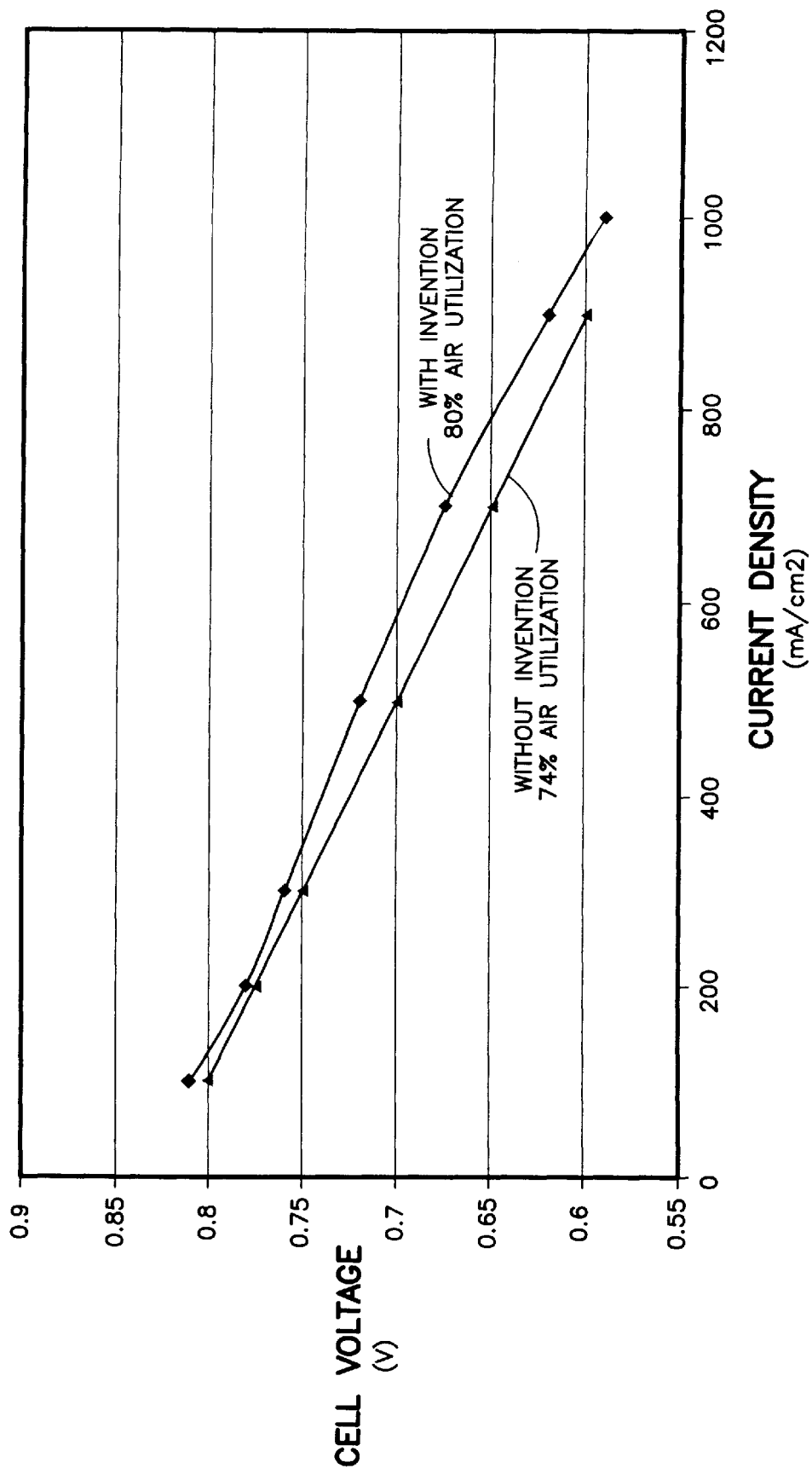
FIG. 6 is a plot of fuel cell performance, cell voltage as a function of current density, comparing a fuel cell not employing the invention operating at 74% air utilization with a fuel cell employing the invention operating at 80% air utilization.

With the improved temperature distribution illustrated in FIG. 5, which results from utilizing the configuration of the present invention, the performance of the fuel cell is improved over a similar fuel cell without the configuration of the present invention, as illustrated in FIG. 6. As can be seen, at any current density, the fuel cell employing the present invention has a higher cell voltage even with a higher air utilization (80%) than does the fuel cell without the invention operating at a lower air utilization (74%).

The aforementioned patent application and patents cited therein are all incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell stack in which each fuel cell comprises:
   a first side edge and a second side edge opposite to said first side edge;
   a first end edge and a second end edge opposite to said first end edge;

a fuel reactant gas inlet at said first end edge and adjacent said second side edge;

a fuel reactant gas turnaround manifold extending across said second end edge;

a first fuel reactant gas flow field adjacent said second side edge and extending from said fuel reactant gas inlet to said fuel reactant gas turnaround manifold;

a fuel reactant gas outlet at said first end edge adjacent to said first side edge;

a second fuel reactant gas flow field adjacent said first side edge extending from said fuel reactant gas turnaround manifold to said fuel reactant gas outlet;

an oxidant reactant gas inlet at said first side edge adjacent said second end edge;

an oxidant reactant gas turnaround manifold extending across said second side edge;

a first oxidant reactant gas flow field extending from said oxidant reactant gas inlet to said oxidant reactant gas turnaround manifold;

an oxidant reactant gas outlet on said first side edge adjacent said first end edge;

a second oxidant reactant gas flow field extending from said oxidant reactant gas turnaround manifold to said oxidant reactant gas outlet, whereby said fuel reactant gas outlet is adjacent to said oxidant reactant gas outlet;

a coolant inlet disposed adjacent said fuel reactant gas outlet and said oxidant reactant gas outlet;

a coolant outlet disposed adjacent to a side of said fuel cell which is opposite to a side of said fuel cell to which said coolant inlet is adjacent; and a coolant flow field extending from said coolant inlet to said coolant outlet.

2. A fuel cell stack according to claim 1 wherein:

said coolant flow field includes at least first and second coolant flow field portions with a coolant turnaround flow field portion extending between said first and second coolant flow field portions.

3. A fuel cell stack according to claim 2 wherein:

said coolant flow field includes three flow field portions with coolant turnaround flow field portions extending between said three flow field portions.

4. A fuel cell stack in which each fuel cell comprises:

a fuel inlet, a fuel outlet, a fuel turnaround manifold, a fuel flow field extending from said inlet to said turnaround manifold, and a fuel flow field extending from said turnaround manifold to said fuel outlet;

an air inlet, an air outlet, an air turnaround manifold, an air flow field extending from said air inlet to said air turnaround manifold, and an air flow field extending from said air turnaround manifold to said air outlet;

characterized by the improvement comprising:
said fuel inlet and said air inlet being displaced from one another and said fuel outlet and said air outlet being adjacent to one another; and
a coolant flow field having an inlet adjacent to both said air outlet and said fuel outlet.

5. A fuel cell according to claim 4 further comprising an overall air utilization of at least 70% and temperature variation across each fuel cell of not more than 15° F.

6. A fuel cell according to claim 4 which has a coolant exit temperature greater than 160° F.

* * * * *